United States Patent
Chory et al.

(10) Patent No.: US 7,448,023 B2
(45) Date of Patent: Nov. 4, 2008

(54) METHOD AND SYSTEM FOR VERIFYING RULE COMPLIANCE OF AN APPLICATION OBJECT

(75) Inventors: Susan Chory, Seattle, WA (US); Matthew E. Gibbs, Redmond, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/067,515

(22) Filed: Feb. 25, 2005

(65) Prior Publication Data

US 2006/0195819 A1  Aug. 31, 2006

(51) Int. Cl.
*G06F 9/44* (2006.01)
(52) U.S. Cl. .................................. 717/124; 715/210
(58) Field of Classification Search ......... 717/108–116, 717/124–126, 210; 705/11
See application file for complete search history.

(56) References Cited

U.S. PATENT DOCUMENTS

| | | | | |
|---|---|---|---|---|
| 5,758,189 A * | 5/1998 | Nakada et al. | ................ | 710/46 |
| 5,819,281 A * | 10/1998 | Cummins | ............... | 707/103 R |
| 6,691,298 B1 * | 2/2004 | Russo et al. | ................ | 717/100 |
| 6,701,513 B1 * | 3/2004 | Bailey | ........................ | 717/109 |
| 6,854,107 B2 * | 2/2005 | Green et al. | ................ | 717/117 |
| 6,898,783 B1 * | 5/2005 | Gupta et al. | ................ | 717/105 |
| 6,993,759 B2 * | 1/2006 | Aptus et al. | ................. | 717/170 |
| 7,113,934 B2 * | 9/2006 | Levesque et al. | ............... | 707/1 |
| 7,127,703 B1 * | 10/2006 | Nachef et al. | ............... | 717/108 |
| 7,171,646 B2 * | 1/2007 | Charisius et al. | ............ | 717/100 |
| 7,210,121 B2 * | 4/2007 | Xia et al. | ..................... | 717/106 |
| 7,240,279 B1 * | 7/2007 | Chartier et al. | ............. | 715/210 |
| 2003/0187724 A1 * | 10/2003 | Litwiller et al. | ................ | 705/11 |
| 2005/0114148 A1 * | 5/2005 | Hinkelman | .................... | 705/1 |
| 2005/0288994 A1 * | 12/2005 | Haunschild | ................... | 705/11 |

* cited by examiner

*Primary Examiner*—Wei Y. Zhen
*Assistant Examiner*—Phillip H Nguyen
(74) *Attorney, Agent, or Firm*—Merchant & Gould; Ryan T. Grace

(57) ABSTRACT

A verification tool applies a set of rules to determine whether an application object is rule compliant when a condition associated with the object is met. The verification tool determines whether the object is associated with a rule compliant property value. If the property value does not comply with the rule, then the rule has been violated and an error message is issued. The rule corresponds to settings implemented by a developer on the component. Thus, the developer is informed when at least one property value associated with the object does not comply with the corresponding rule. Feedback is provided about which specific object is not rule compliant such that the component may be modified to be rule compliant.

12 Claims, 3 Drawing Sheets

METHOD AND SYSTEM FOR VERIFYING RULE COMPLIANCE OF AN APPLICATION OBJECT

BACKGROUND

Web page developers commonly design web pages to conform to certain requirements (e.g., extensible hypertext markup language conformance, business rules, style rules, accessibility, etc.). The intent of these rules is to enforce a standard such that third party client software may interpret the information is a consistent manner commiserate with best practices. For example, the Web Content Accessibility Guidelines (WCAG) explain how to make web content accessible to people with disabilities. Section 508 of the Americans with Disabilities Act (ADA) requires Federal agencies to make their electronic and information technology accessible to people with disabilities. These accessibility rules eliminate barriers in information technology, present new opportunities to people with disabilities, and encourage development of technologies focused on these goals.

Private industry and research entities have also begun demonstrating significant initiative in improving information technology access for people with disabilities. For example, blind users of the Web frequently use software called a screen reader to read the contents of a web page out loud. Screen readers allow users to hear the contents of a web page rather than read them. However, a screen reader can only read text, not images or animations. Thus, it is important that images and animations have text descriptions associated with them for a screen reader to use. This text is referred to as alternate text.

Rules may be difficult to enforce when responding to a client because an abstraction may exist between the original code and the response. For example, a web page developer may easily design a run time component on dynamically created web page (e.g., an ASP.NET page) that is accessible to people with disabilities. However, the developer may neglect to include critical information on the page such that the component is rendered inaccessible. For example, the developer may forget to provide an image tag with an alternate text property. The developer is not informed that the component is inaccessible until after the page is compiled and the corresponding hypertext markup language (HTML) is generated. The HTML is presented to an accessibility rule checker that generates an error message when the component is inaccessible. The error message indicates where the error occurred in the HTML. However, the developer is not informed where the information was omitted on the ASP.NET page. This is problematic because the HTML tags do not directly correspond to the tags on the ASP.NET page.

SUMMARY

The present disclosure is directed to a method and system for verifying rule compliance of an application object. A verification tool may access and apply a set of rules to determine whether a run time object is rule compliant. The object provides an abstraction over raw generated content. In one embodiment, the run time object is a component on an dynamically created web page. The component may be a control, a tag, a form, a web service element, or any other run time object. Each component may be associated with a condition that executes a corresponding rule when met, and a property value that is checked to determine rule compliance.

The rules may be any guidelines that an application developer relies on to design the application. For example, the rules may correspond to WCAG, ADA Section 508, markup language compliance guidelines, customized rules for an enterprise, localization rules for a specific language, country or geographic region, etc. Each rule may be a self-contained conditional verification rule that the component is tested against to determine whether the component is rule compliant. The rules may be self-defined such that any verification tool may be used to determine whether a component is rule compliant when the condition associated with the component is met.

The verification tool determines whether the component is associated with property values that comply with the corresponding rule in the abstraction. If the property value does not comply with the rule, then the rule has been violated and an error message is issued. Information embedded in the component is used to generate the error message.

The rule corresponds to settings implemented by the developer of the component. Thus, the component user may be informed when at least one property value associated with the component does not comply with the corresponding rule. Feedback is provided about which specific property value(s) of the component caused the failure such that the component may be modified to be rule compliant. The component may be modified automatically or in response to user input.

In accordance with one aspect of the invention, an object is accessed. The object provides an abstraction over raw generated content. A determination is made whether a condition associated with an object is met. Another determination is made whether the object complies with a rule in the abstraction when the condition is met. When the object does not comply with the rule, a message is issued that the object does not comply with the rule. The message references the object. The object is then modified to comply with the rule when the object does not comply with the rule.

DETAILED DESCRIPTION OF THE PREFERRED EMBODIMENT

The present disclosure is directed to a method and system for verifying rule compliance of an application object. A verification tool applies a set of rules to determine whether the object is rule compliant when a condition associated with the object is met. The rules may be any guidelines that an application developer relies on to design the application. The verification tool determines whether a rule compliant property value is associated with the object. If the property value does not comply with the rule, then the rule has been violated and an error message is issued. The rule corresponds to settings implemented by the developer on the component. Thus, the developer is informed when at least one property value associated with the objects does not comply with the corresponding rule. Feedback is provided about which specific object is not rule compliant such that the component may be modified to comply with the rule.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
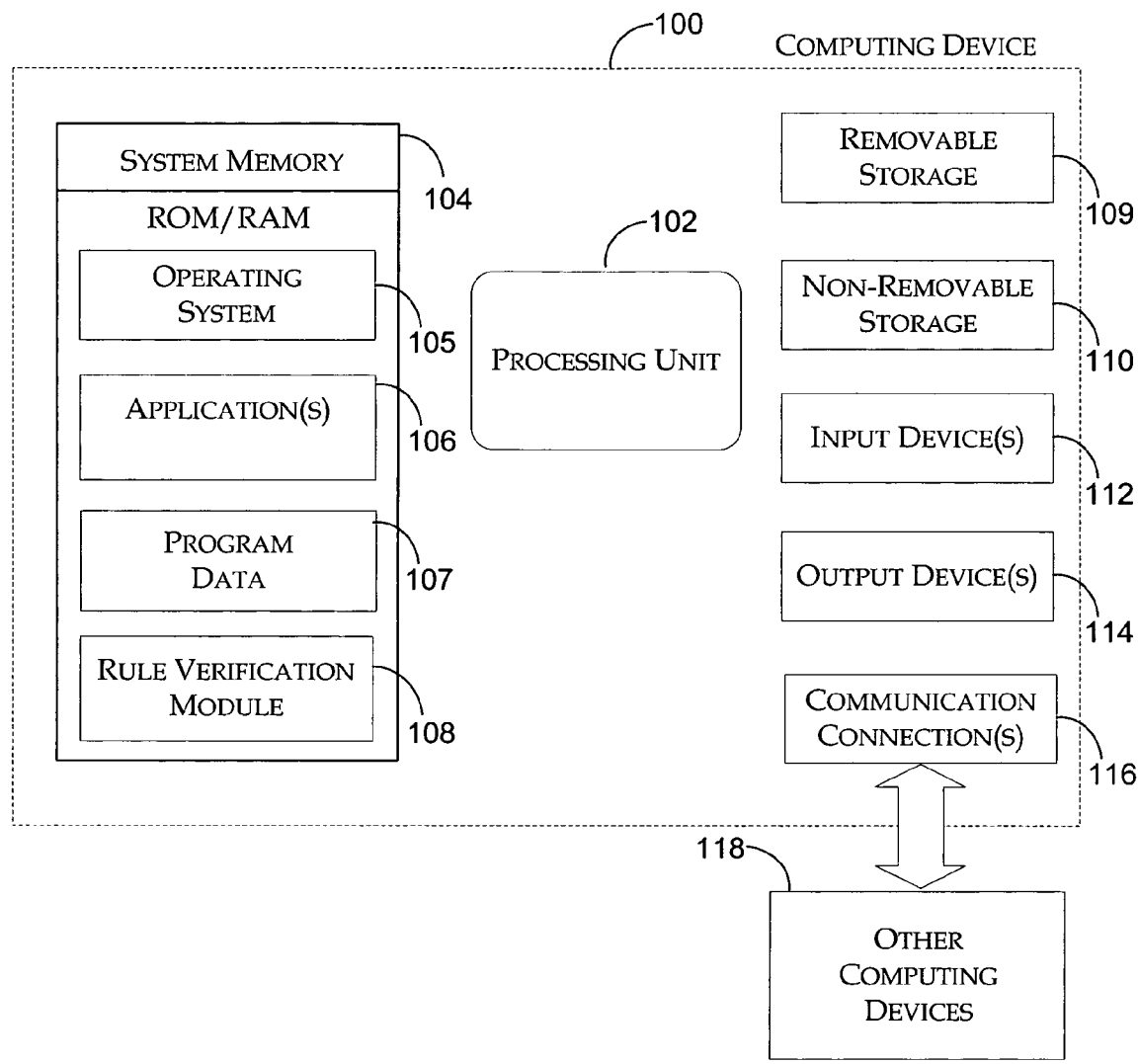
FIG. 1 illustrates a computing device that may be used according to an example embodiment of the present invention.
Figure 2:
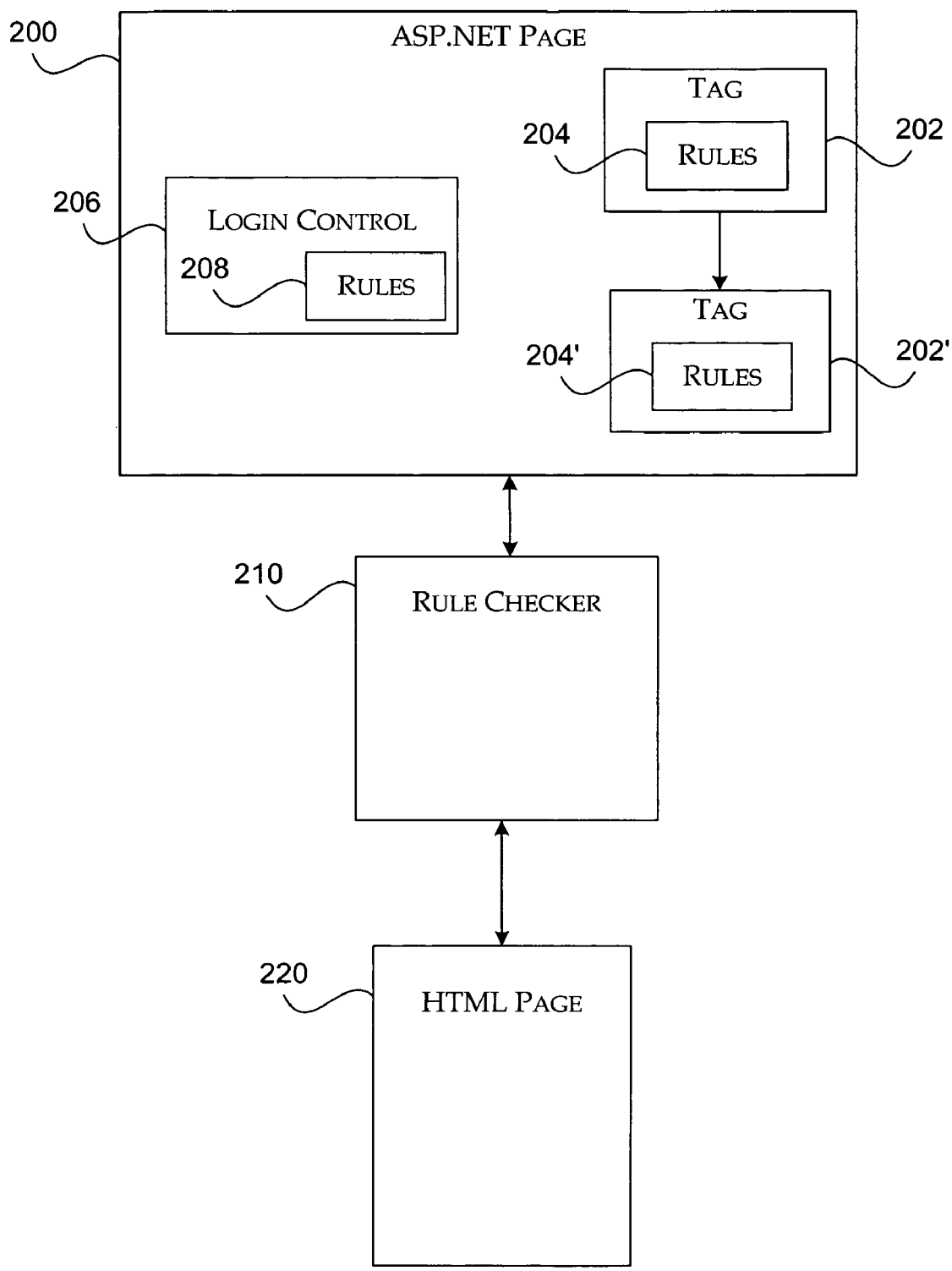
FIG. 2 illustrates a block diagram illustrating a system for verifying rule compliance of an application object, in accordance with at least one feature of the present invention.
Figure 3:
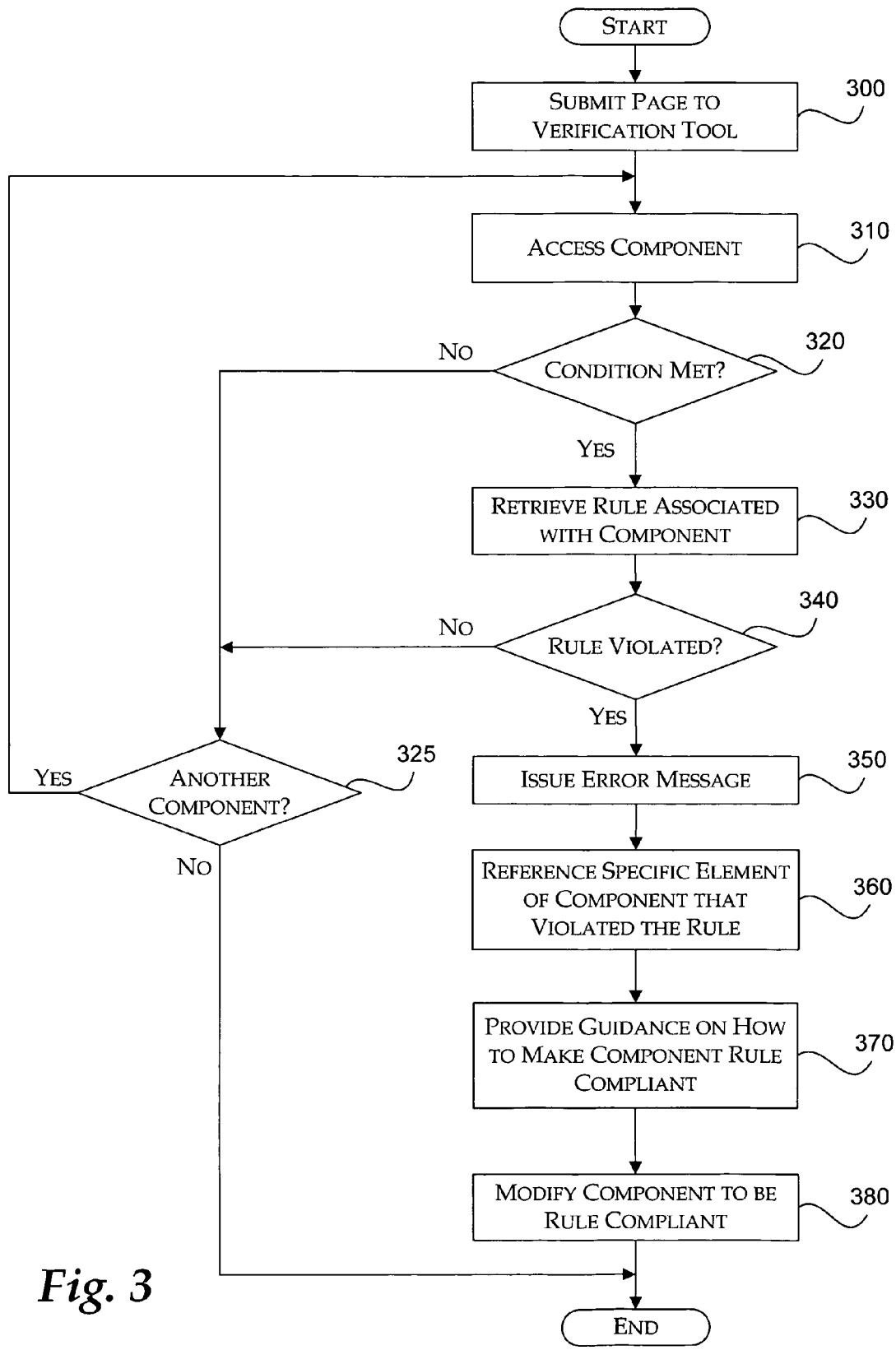
FIG. 3 illustrates an operational flow diagram illustrating a process for verifying rule compliance of an application object, in accordance with at least one feature of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A rule verification module 108, which is described in detail below with reference to FIGS. 2-4, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Verifying Rule Compliance of an Application Object

FIG. 2 illustrates a block diagram of a system for verifying rule compliance of an application object. The system is described with reference to a dynamically created web page, such as ASP.NET page 200. However, the system is not limited to the web space. The system may be integrated with any type of run time object such that a verification tool may access and apply a set of rules to determine whether the object is rule compliant. The system may be applied to a large variety of scenarios including: utilities for checking the rule compliance of an application, applications for documenting rules associated with a component, applications used during development time to enforce compliance practices, etc.

The system includes ASP.NET page 200, rule checker 210, and HTML page 220. Rule checker 210 is an example of a verification tool. A web developer creates ASP.NET page 200 by inserting at least one run time object (e.g., a component) on the page. The object provides an abstraction over raw generated content. The component may be a control, a tag, a form, a web service element, or any other run time object. For example, ASP.NET page 200 may include components such as tags 202, 202' and login control 206. The components may be predefined in the application, imported from a third party source (e.g., a vendor), generated from an existing component (as described in further detail below), or created by the web developer.

Each component includes an embedded set of rules. For example, tag 202 includes rules 204, tag 202' includes rules 204', and login control 206 includes rules 208. Rules 202, 204', 208 may be any rules in the abstraction that a web developer relies on to design ASP.NET page 200. For example, the rules may correspond to WCAG, ADA Section 508, markup language compliance guidelines, customized rules for an enterprise, localization rules for a specific language, country or geographic region, etc. Furthermore, the rules may include multiple rule versions that target different guidelines(e.g., WCAG 1.0, 1.1, and 2.0; XHTML 1.0 and 1.1, etc.).

In one embodiment, the rules are self-contained conditional verification rules. The rules may be self-defined such that any verification tool may be used to determine whether a component is rule compliant. In one embodiment, the web developer defines a condition that, when met, causes the component to be tested for compliance with the corresponding rule. For example, a condition may be defined as SubmitButtonType=Image. In other words, when the property value of the property "SubmitButtonType" is an image, then a rule associated with alternate text for images is verified for compliance because the condition that the button is an image is met. However, if SubmitButtonType=PushButton, the condition is not met so the rule is not checked. The web developer may also define additional information associated with the condition such as a name, additional resources, and a priority level. Conditions are described in further detail below.

The web developer submits ASP.NET page 200 to rule checker 210. Rule checker 210 may predict how the components on ASP.NET page 200 will be compiled on rendered HTML page 220. Rule checker 210 determines whether the components on ASP.NET page 200 are compliant with corresponding rules 204, 204', 208. Because rules 204, 204', 208 are embedded in the corresponding components, rule checker 210 informs the web developer when at least one property value of the components on ASP.NET page 200 does not comply with the corresponding rule. The web developer is also informed which specific component is not compliant with rules 204, 204', 208 such that any noncompliant components may be modified to overcome the rule violation.

The actions performed by rule checker 210 are independent of the rendered output (e.g., rendered HTML page 220). Rule checker 210 checks whether the condition that causes a rule to execute has been met. Rule checker also determines whether the property values of the components (e.g., tags 202, 202' and login control 206) are in compliance with rules 204, 204', 208. If the property values are determined to be non-compliant with rules 204, 204', 208, feedback is provided about the specific property value(s) that caused the violation. In one embodiment, the feedback may be used to provide specific guidance to inform the web developer how to overcome the rule violation. In another embodiment, the feedback may be used to automatically modify the component to be rule compliant. The feedback may be provided as part of an issued error message.

In one embodiment, rules 204, 204', 208 may be encapsulated within the corresponding components such that the components conform to rules 204, 204', 208 by default. In another embodiment, rules 204, 204', 208 and conditions may be synchronized with the underlying code to reduce maintenance issues as attributes evolve during development.

Each rule within rules 204, 204', 208 may include information related to type of violation (error or warning), the guidelines that are applied, the priority, the relevant section of the guidelines, and a corresponding text message. The information may be provided to an application programming interface. For example, WCAG includes a rule that is referred to as "alternate text for images." The rule includes the following information:
  Type: Error
  Guideline: WCAG
  Priority: 1
  Relevant Section: WCAG 1.1
  Text Message: An image is missing a meaningful text equivalent. Please check the value of <fill in property name> property.

An example component (e.g., login control 206) to check for compliance with the "alternate text for images" rule may include the following information:
  Control: Login
  Check Condition: SubmitButtonType=Image
  Check Property: SubmitButtonText
  Value: Not Null A web developer may insert login control 206 on ASP.NET page 200. A screen reader may read corresponding alternate text (e.g., "Click here to log in"). The web developer may then check ASP.NET page 200 to determine WCAG compliancy. Rule checker 210 processes ASP.NET page 200 and locates login control 206.

Rule checker 210 determines that the condition corresponding to login control 206 states that the SubmitButtonText property must be an image (i.e., from "Check Condition"). Rule checker 210 also determines whether any text has been provided for the corresponding property values (i.e., the value of the SubmitButtonText property cannot be null). If no text values have been entered for the SubmitButtonText property, an error message is issued that informs the web developer of a WCAG violation. The web developer is informed that a text value must be entered for the SubmitButtonText property to make login control 206 accessible for a screen reader. An error of priority 1 is generated corresponding to WCAG section 1.1. The issued error message reads, "An image is missing a meaningful text equivalent. Please check the value of SubmitButtonText property." In one embodiment, default text is automatically associated with the corresponding property values such that login control 206 is rule compliant.

In one embodiment, a component may be derived from an established component. For example, tag 202 may be a predefined component that a web developer selected and positioned on ASP.NET page 200. Tag 202 is associated with a set of verification rules (e.g., rules 204). The web developer may need a component that is similar to tag 202. Rather than creating a new component, a new tag (e.g., tag 202') may be derived from tag 202. Tag 202' inherits the existing verification rules (e.g. 204') from tag 202. A web developer may customize the derived component for a specific purpose by adding, deleting, or editing the inherited rules. Alternatively, the inherited rules may be overridden by the web developer.

In another example of rule inheritance, an image may be associated with a rule that checks for an associated alternate text property. A new image component may be inherited from the original image. The rule associated with the new image component is automatically inherited from the original image. In one embodiment, a component may be inherited and a second set of verification rules may be associated with the component. Thus, a second set of conditions are checked against the second set of verification rules. The more often that a rule is inherited and associated with components at lower levels of a component hierarchy, the more complex the rule may become. Thus, rule inheritance precludes the need to replicate the same rule information for each child component.

FIG. 3 illustrates an operational flow diagram illustrating a process for verifying rule compliance of an application object. The process begins at a start block where an application developer desires to verify whether a run time object of the application complies with a set of established rules. In one embodiment, the application is a web application, the run time object is a component of an ASP.NET web page, and the rules are guidelines relied upon by the developer when designing the ASP.NET web page. Each component is associated with a condition such that when the condition is met, the rule corresponding to the component is verified for compliance.

The ASP.NET page is submitted to a verification tool to verify whether the components are rule compliant at block 300. Proceeding to block 310, the verification tool accesses a component on the page. The component provides an abstraction over raw generated content. The component may be accessed during run time, design time, or verification time. Each component includes information related to the type of component, the condition that must be met to execute the corresponding rule, and an acceptable property value of the component for rule compliance.

Advancing to decision block 320, a determination is made whether the condition associated with the component has been met. In one embodiment, the condition is defined by a web developer. If the condition has been met, processing continues at block 330. If the condition has not been met, processing proceeds to decision block 325 where a determination is made whether any other components exist on the ASP.NET page that need to be verified for rule compliance. If no further components need to be verified, processing terminates at an end block because no errors or warnings need to be issued. If any other components exist on the page that have not yet been verified for rule compliance, processing returns to block 310 where the next component on the page is accessed.

Transitioning to block 330, the verification tool retrieves the rule associated with the component. The rule may include information regarding the type of error, the guidelines applied, the priority level, the relevant section of the guidelines, and a corresponding text message. The rule is a self-contained conditional that the component is tested against to determine whether the component is compliant with the rule when the condition is met. The rule corresponds to settings implemented by the developer on the component. Thus, the developer is informed when a property value associated with the component does not comply with the corresponding rule.

Continuing to decision block 340, a determination is made whether the component violates the rule in the abstraction. For example, the verification tool determines whether a rule compliant property value has been entered for a property of the component. If the rule has been violated, processing continues at block 350. If the rule has not been violated, processing continues to decision block 325.

Moving to block 350, an error message is issued. Information embedded in the component is used to generate the error message. The error message may include the type of error (e.g., WCAG error), the severity of the error (e.g., priority 1), a text message that describes which component caused the rule violation, and a resource link that provides further information and examples associated with the error.

Proceeding to block 360, a specific element of the component that caused the rule violation is referenced to inform the web developer which property value must be changed to overcome the rule violation. In one embodiment, a parent tag may be referenced along with the associated property value that caused the rule violation because the rules are encapsulated within the conditional property.

Advancing to block 370, the web developer is provided with guidance on how to modify the component to be rule compliant. In one example, the web developer may be provided with a link to resources that provide explanations and examples for overcoming the rule violation. In another example, the guidance is provided with the issued error message.

Transitioning to block 380, the component is modified to be rule compliant. In one embodiment, the component may be modified by any user (e.g., a web developer, a component user, a page developer) to be rule compliant. The user may modify the component based on the provided guidance. In another embodiment, the component is automatically modified to be rule compliant. For example, an acceptable property value of the component is automatically associated with the component. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for testing whether a runtime component of a dynamic website building application complies with an embedded verification rule, the method comprising:

obtaining a runtime component on a dynamic website building application, wherein the runtime component includes an embedded verification rule for testing whether the runtime component complies with the embedded verification rule, wherein the embedded verification rule is associated with an alternate text for images rule, wherein the alternate text for images rule is a rule that facilitates the checking for an equivalent text description of an image;

obtaining a predefined property condition which causes the runtime component to be tested for compliance with the embedded rule when the predefined property condition is associated with the runtime component, wherein the predefined property condition includes an image property;

when the predefined property condition is associated with the runtime component, submitting the runtime component to a rule checker, checking, by the rule checker, whether the runtime component complies with the embedded rule, wherein checking includes checking the runtime component to determine whether the image property includes alternate text, wherein checking, by the rule checker, is independent from rendering an HTML page associated with the runtime component, and when the runtime component does not comply with the embedded rule, generating notification indicating at least one property value of the runtime component on the dynamic website building application that does not comply with the embedded rule.

2. The computer-implemented method of claim 1, wherein the runtime component is at least one member of a group comprising: a component derived from an established component, a pregenerated component, and a new component.

3. The computer-implemented method of claim 1, wherein the notification includes an error message that defines a reason for the notification and identifies a property having an inappropriate value.

4. The computer-implemented method of claim 1, further comprising modifying the runtime component to comply with the embedded rule.

5. A computer-readable storage medium having computer executable instructions for testing whether a runtime component of a dynamic website building application complies with an embedded verification rule, the instruction comprising:

obtaining a runtime component on a dynamic website building application, wherein the runtime component includes an embedded verification rule for testing whether the runtime component complies with the embedded verification rule, wherein the embedded verification rule is associated with an alternate text for images rule, wherein the alternate text for images rule is a rule that facilitates the checking for an equivalent text description of an image;

obtaining a predefined property condition which causes the runtime component to be tested for compliance with the embedded rule when the predefined property condition is associated with the runtime component, wherein the predefined property condition includes an image property;

when the predefined property condition is associated with the runtime component, submitting the runtime component to a rule checker, checking, by the rule checker, whether the runtime component complies with the embedded rule, wherein checking includes checking the runtime component to determine whether the image property includes alternate text, wherein checking, by the rule checker, is independent from rendering an HTML page associated with the runtime component, and when the runtime component does not comply with the embedded rule, generating notification indicating at least one property value of the runtime component on the dynamic website building application that does not comply with the embedded rule.

6. The computer-implemented method of claim 5, wherein the runtime component is at least one member of a group comprising: a component derived from an established component, a pregenerated component, and a new component.

7. The computer-implemented method of claim 5, wherein the notification includes an error message that defines a reason for the notification and identifies a property having an inappropriate value.

8. The computer-implemented method of claim 5, further comprising modifying the runtime component to comply with the embedded alternative text rule.

9. A system for testing whether a runtime component of a dynamic website building application complies with an embedded verification rule, the system comprising:

a processor, and a memory having computer executable instruction stored thereon for:

obtaining a runtime component on a dynamic website building application, wherein the runtime component includes an embedded verification rule for testing whether the runtime component complies with the embedded verification rule, wherein the embedded verification rule is associated with an alternate text for images rule, wherein the alternate text for images rule is a rule that facilitates the checking for an equivalent text description of an image;

obtaining a predefined property condition which causes the runtime component to be tested for compliance with the embedded rule when the predefined property condition is associated with the runtime component, wherein the predefined property condition includes an image property;

when the predefined property condition is associated with the runtime component, submitting the runtime component to a rule checker, checking, by the rule checker, whether the runtime component complies with the embedded rule, wherein checking includes checking the runtime component to determine whether the image property includes alternate text, wherein checking, by the rule checker, is independent from rendering an HTML page associated with the runtime component, and when the runtime component does not comply with the embedded rule, generating notification indicating at least one property value of the runtime component on the dynamic website building application that does not comply with the embedded rule.

10. The system of claim 9, wherein the runtime component is at least one member of a group comprising: a component derived from an established component, a pregenerated component, and a new component.

11. The system of claim 9, wherein the notification includes an error message that defines a reason for the notification and identifies a property having an inappropriate value.

12. The system of claim 9, further comprising modifying the runtime component to comply with the embedded rule.

* * * * *